(12) United States Patent
Smith et al.

(10) Patent No.: US 8,755,282 B2
(45) Date of Patent: Jun. 17, 2014

(54) PROVISION OF PATH CHARACTERIZATION INFORMATION IN NETWORKS

(75) Inventors: Alan P Smith, Ipswich (GB); Arnaud Jacquet, Ipswich (GB); Robert J Briscoe, Woodbridge (GB); Andrea Soppera, High Wycombe (GB); Stephen C Appleby, Colchester (GB); Tobias Moncaster, Colchester (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 93 days.

(21) Appl. No.: 13/579,166

(22) PCT Filed: Mar. 16, 2011

(86) PCT No.: PCT/GB2011/000364
§ 371 (c)(1),
(2), (4) Date: Aug. 15, 2012

(87) PCT Pub. No.: WO2011/121270
PCT Pub. Date: Oct. 6, 2011

(65) Prior Publication Data
US 2012/0320779 A1    Dec. 20, 2012

(30) Foreign Application Priority Data

Mar. 31, 2010  (GB) ................................. 10250693.8

(51) Int. Cl.
*H04L 12/26*   (2006.01)
*H04L 12/56*   (2006.01)
*H04L 12/70*   (2013.01)

(52) U.S. Cl.
CPC ................. *H04L 47/35* (2013.01); *H04L 47/10* (2013.01); *H04L 2012/5629* (2013.01)
USPC ........................................................ 370/235

(58) Field of Classification Search
CPC ................... H04L 47/10–47/15; H04L 47/27; H04L 47/2441; H04L 47/70; H04L 47/50; H04L 47/30; H04L 47/35; H04L 47/32; H04L 2012/5636; H04L 2012/5632; H04L 2012/5602
See application file for complete search history.

(56) References Cited

U.S. PATENT DOCUMENTS

| | | | | |
|---|---|---|---|---|
| 7,272,651 | B1 * | 9/2007 | Bolding et al. | 709/227 |
| 2009/0003214 | A1 * | 1/2009 | Vaswani et al. | 370/236 |
| 2010/0220588 | A1 * | 9/2010 | Plamondon | 370/230 |

FOREIGN PATENT DOCUMENTS

| | | |
|---|---|---|
| WO | WO 01/97446 | 12/2001 |
| WO | WO 2006/099883 | 9/2006 |

OTHER PUBLICATIONS

International Search Report for PCT/GB2011/000364 mailed May 2, 2011.

(Continued)

*Primary Examiner* — Phuc Tran
(74) *Attorney, Agent, or Firm* — Nixon & Vanderhye P.C.

(57) ABSTRACT

Path characterization information is provided to a data sender relating to a network characteristic such as congestion experienced by data units traversing a path across a data network from the data sender towards one of a plurality of data receivers. The data units have associated therewith information indicative of the network characteristic. The path is traversed by the data units having at least a first path portion between the data sender and a proxy node along which data units may traverse conveying a measure indicative of the network characteristic that is representable by any of a first set of codepoints. The data receivers are operable to provide data acknowledgement units in respect of data units they receive via a second path portion in which information indicative of the network characteristic may only be representable using codepoints of a second set of codepoints having less codepoints than the first set.

13 Claims, 13 Drawing Sheets

(56) References Cited

OTHER PUBLICATIONS

Written Opinion of the International Searching Authority mailed May 2, 2011.
Search Report for EP 10250693 dated Jul. 28, 2010.
B. Briscoe et al., "Re-ECN: Adding Accountability for Causing Congestion to TCP/IP", Internet Engineering Tack Force, No. 7, Mar. 3, 2009, http://tools.ietf.org/id/draft-briscoe-tsvwg-re-ecn-tcp-07.txt, 48 pages.
B. Briscoe et al., "Re-ECN: A Framework for Adding Congestion Accountability for TCP/IP", No. 1, http://tools.ietf.org/id/draft-briscoe-tsvwg-re-ecn-tcp-motivation-01.txt, Sep. 18, 2009, 50 pages.
S. Kent et al., "Security Architecture for the Internet Protocol", RFC 4301, Dec. 2005, http://www.rfc-editor.org/rfc/pdfrfc/rfc4301.txt.pdf, 101 pages.
B. Briscoe et al., "Policing Congestion Response in an Internetwork Using Re-feedback", In Proc ACM SICCOMM'05, Computer Communications Review 35(4), Sep. 2005, http://portal.acm.org/citation.cfm?id=1080124 ,12 pages.
K. Ramakrishnan et al., "The Addition of Explicit Congestion Notification (ECN) to IP", RFC 3168, Sep. 2001, http://tools.ietf.org/rfc/rfc3168.txt, 59 pages.
S. Floyd et al, "Random Early Detection Gateways for Congestion Avoidance", IEEE/ACM Transactions on Networking, vol. 1-4, (397-413), Aug. 1993, http://dl.acm.org/citation.cfm?id=169935.
O.B. Karimi et al., "Application level Wireless Multi-level ECN for Video and Real-time Data" Networking, International Conference on Systems and International Conference on Mobile Communications and Learning Technologies, 2006: http://ieeexplore.ieee.org/stamp/stamp.jsp?tp=&arnumber=1628383.
O. Medina et al., "A proposal for the Use of ECN bits with UDP Flows", IETF Internet Draft <draft-medina-ecn-udp-00.txt>, Jul. 2000: http://tools.ietf.org/pdf/draft-medina-ecn-udp-00.pdf, 4 pages.
P. Eardley (editor), "Pre-Congestion Notification Architecture", IETF internet draft draft-ietf-pcn-architecture-02, Nov. 2007: http://tools.ietf.org/id/draft-ietf-pcn-architecture-02.txt, 42 pages.
J. Border et al., "Performance Enhancing Proxies Intended to Mitigate Link-Related Degradations", <draft-ietf-pilc-pep-07.txt>, Jun. 2001: http://tools.ietf.org/pdf/rfc3135.pdf , 46 pages.

\* cited by examiner

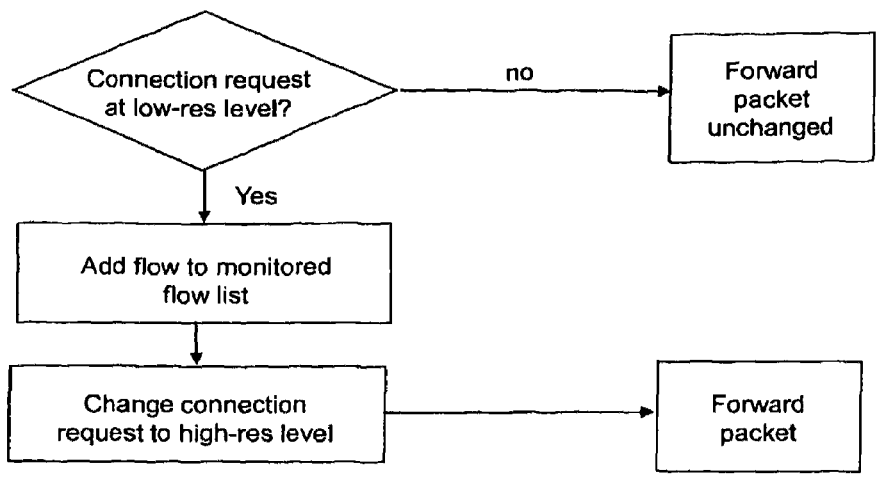
Figure 1 — Steps Performed by Proxy on Receipt of Connection Request
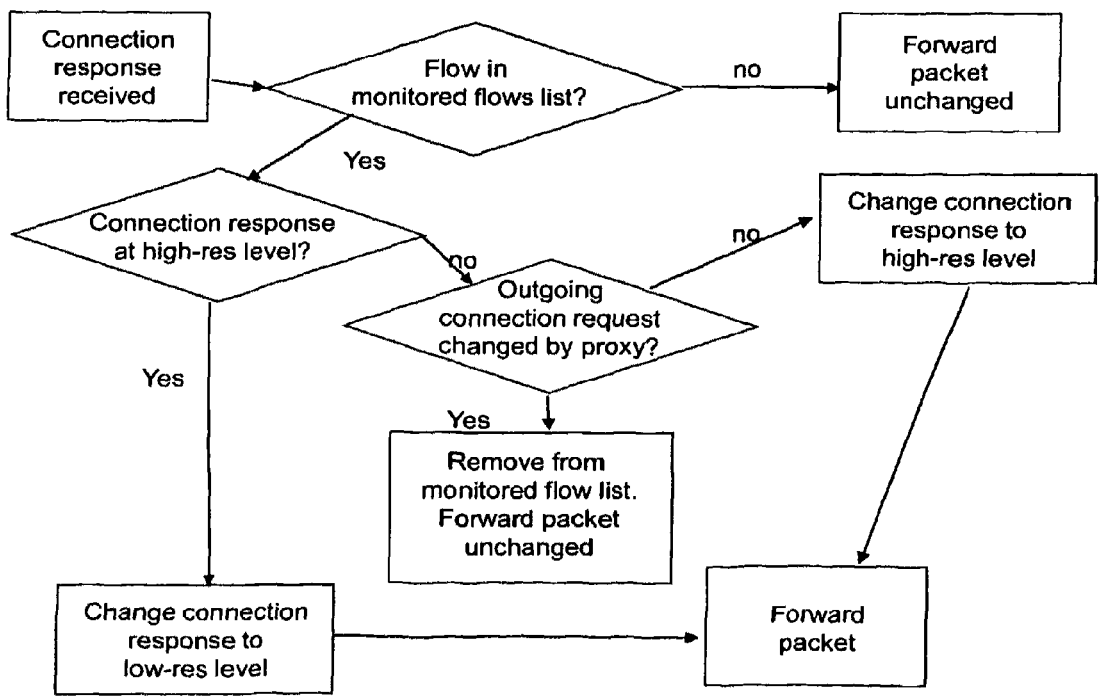
Figure 2 - Steps Performed by Proxy on Receipt of Acknowledgement

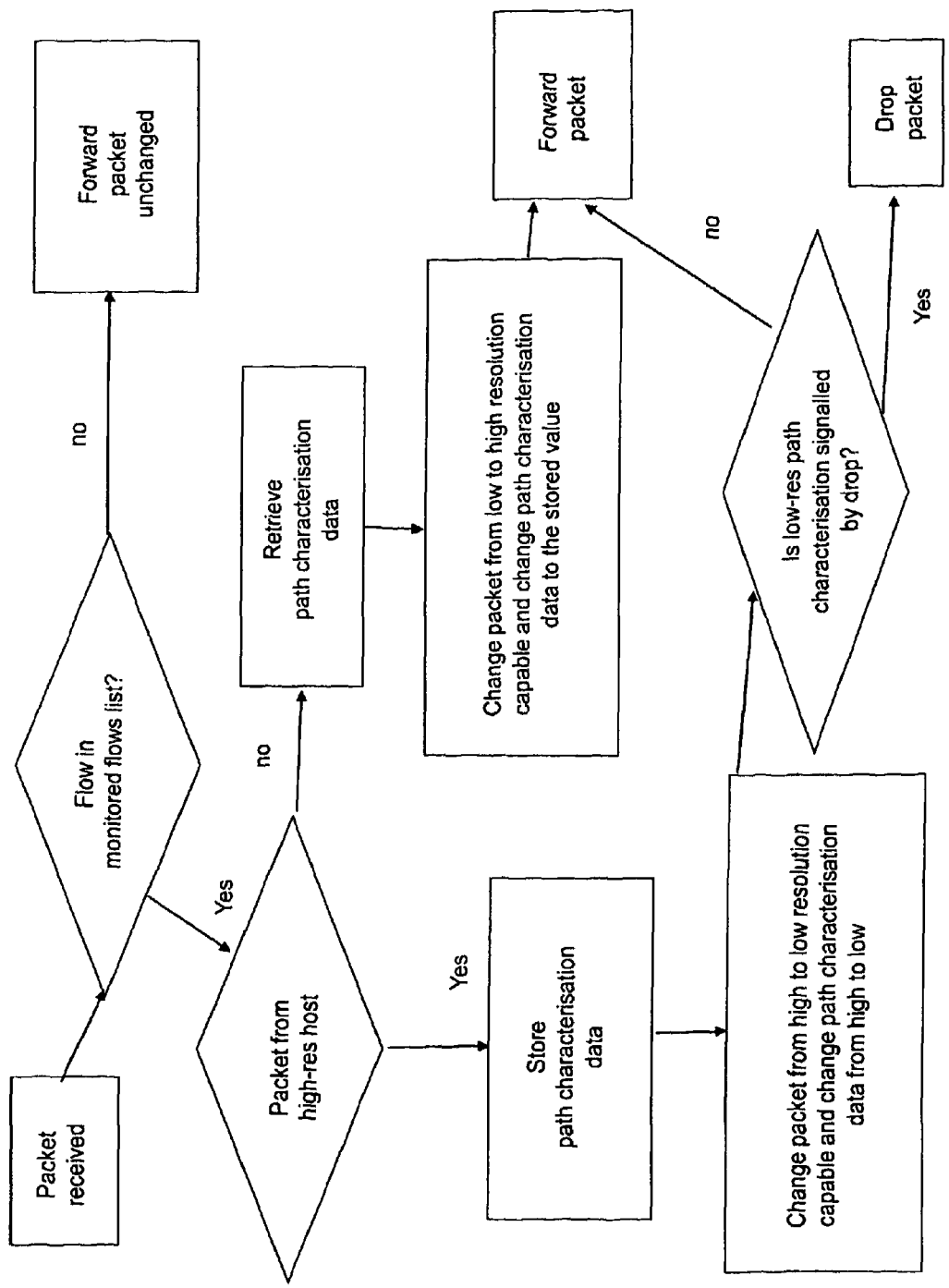
Figure 3 - Steps Performed by Proxy in Respect of Subsequent Packets

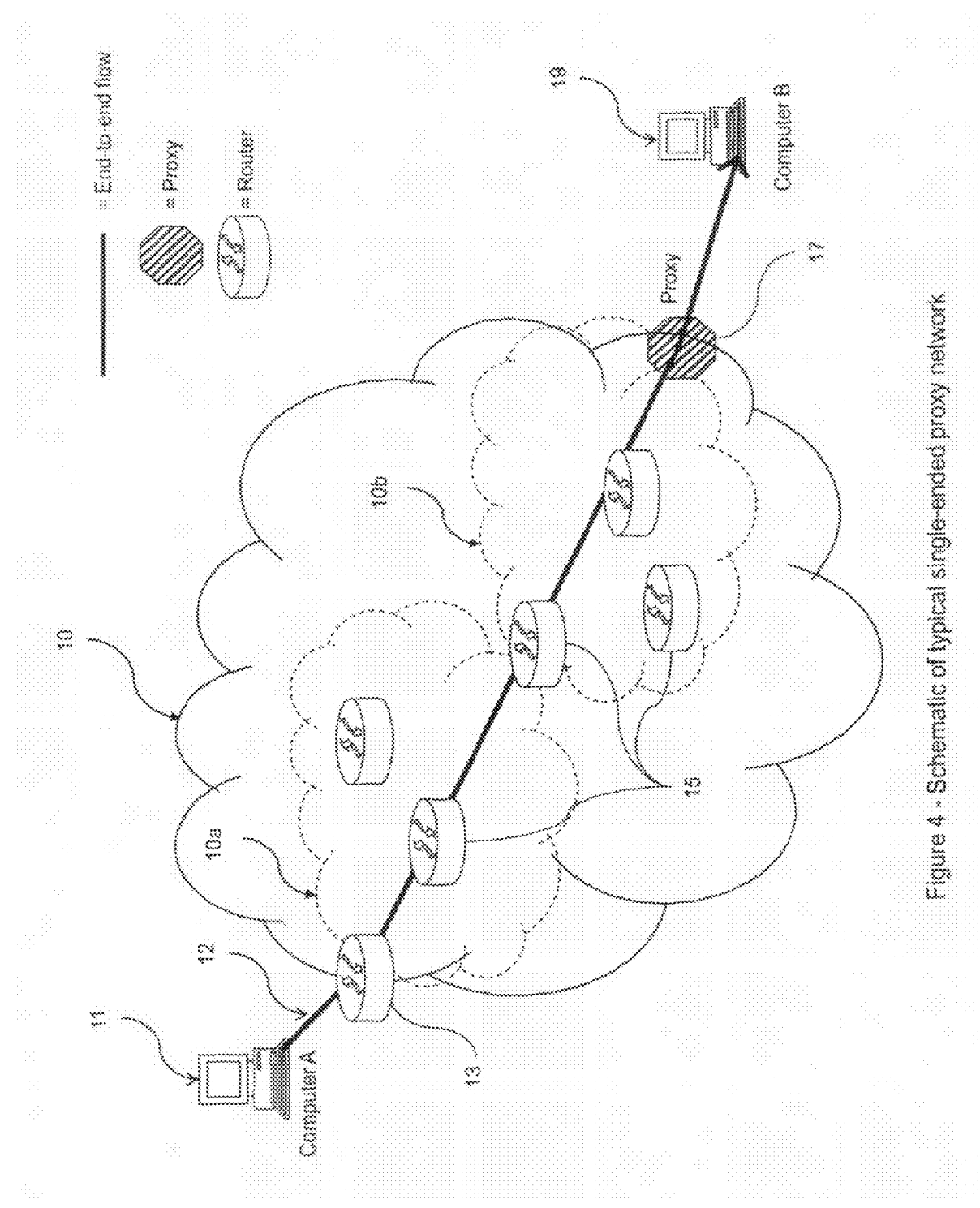
Figure 4 - Schematic of typical single-ended proxy network

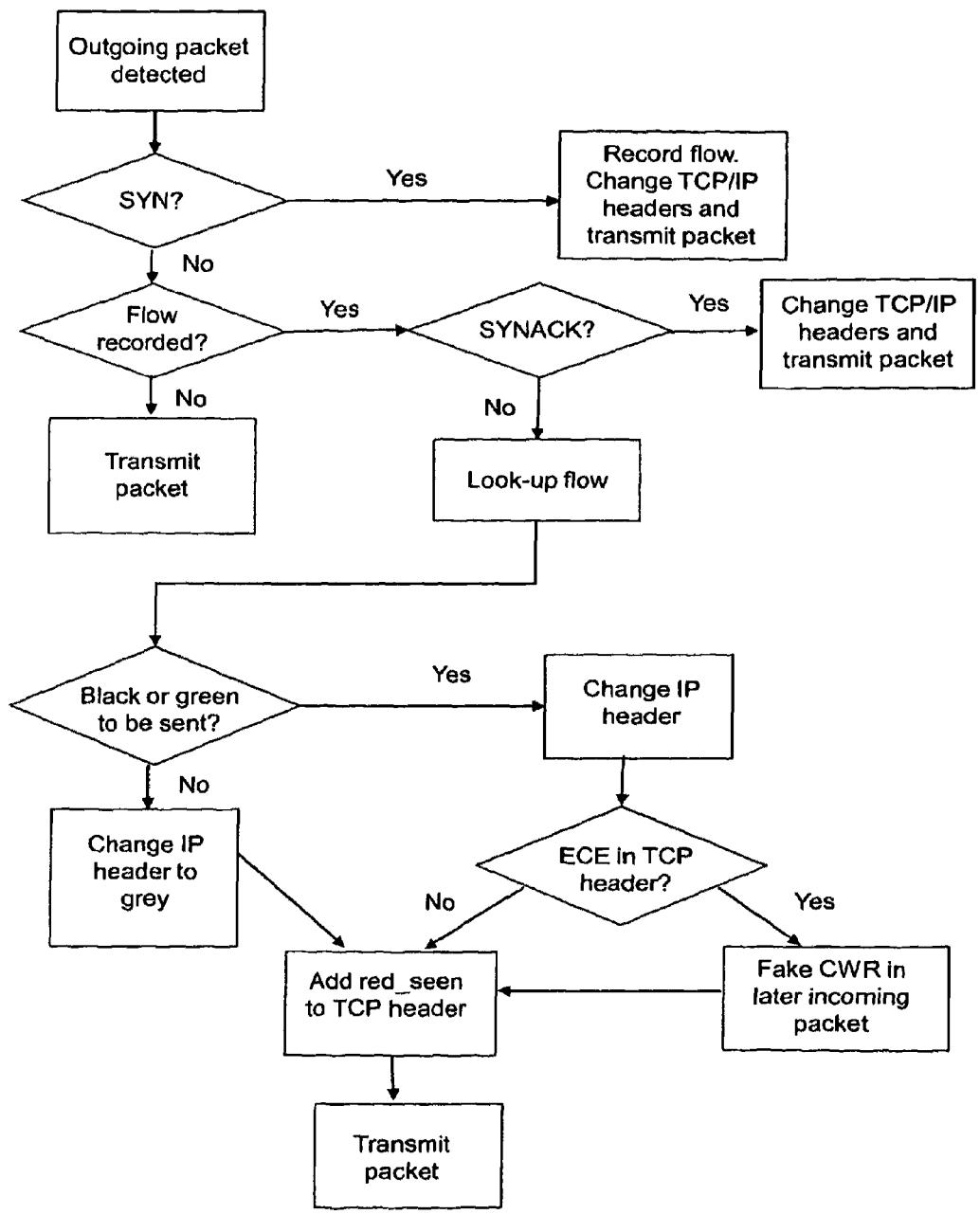
Figure 5 - DPI Proxy Acting on Outgoing Packets from Computer A to Computer B

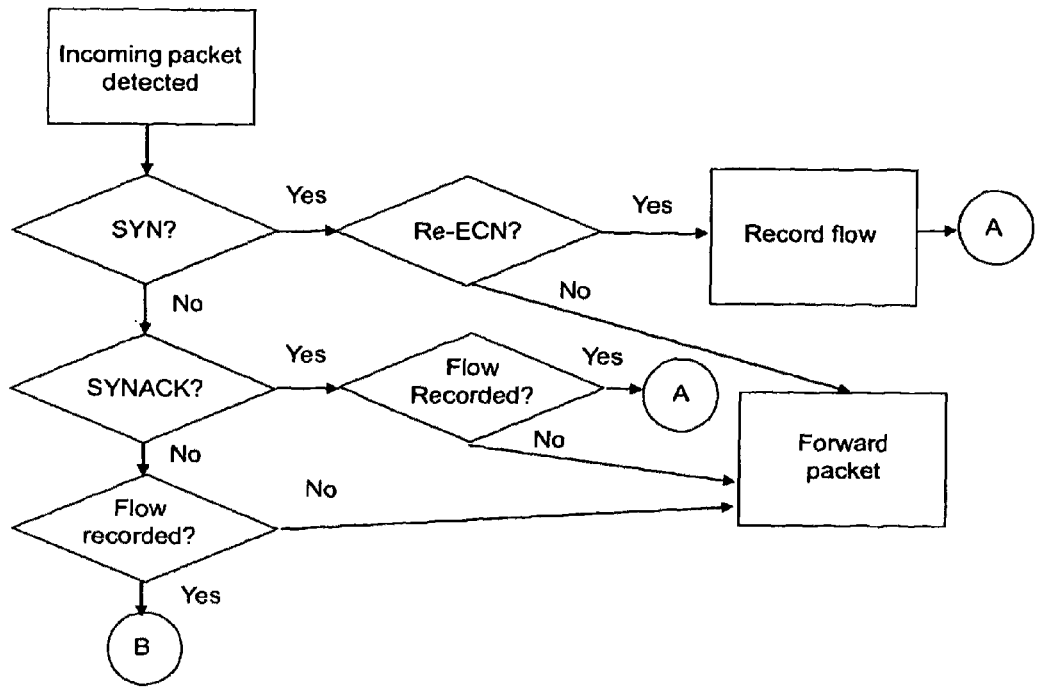
Figure 6(a) - DPI Proxy acting on Incoming Packets from Computer B to Computer A
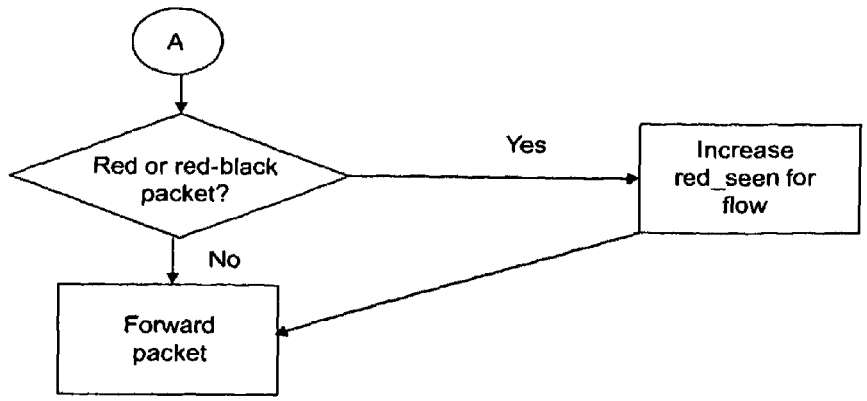
Figure 6(b) - DPI Proxy acting on Incoming Packets (continued): Setting IP Headers for SYN and SYN-ACK Packets

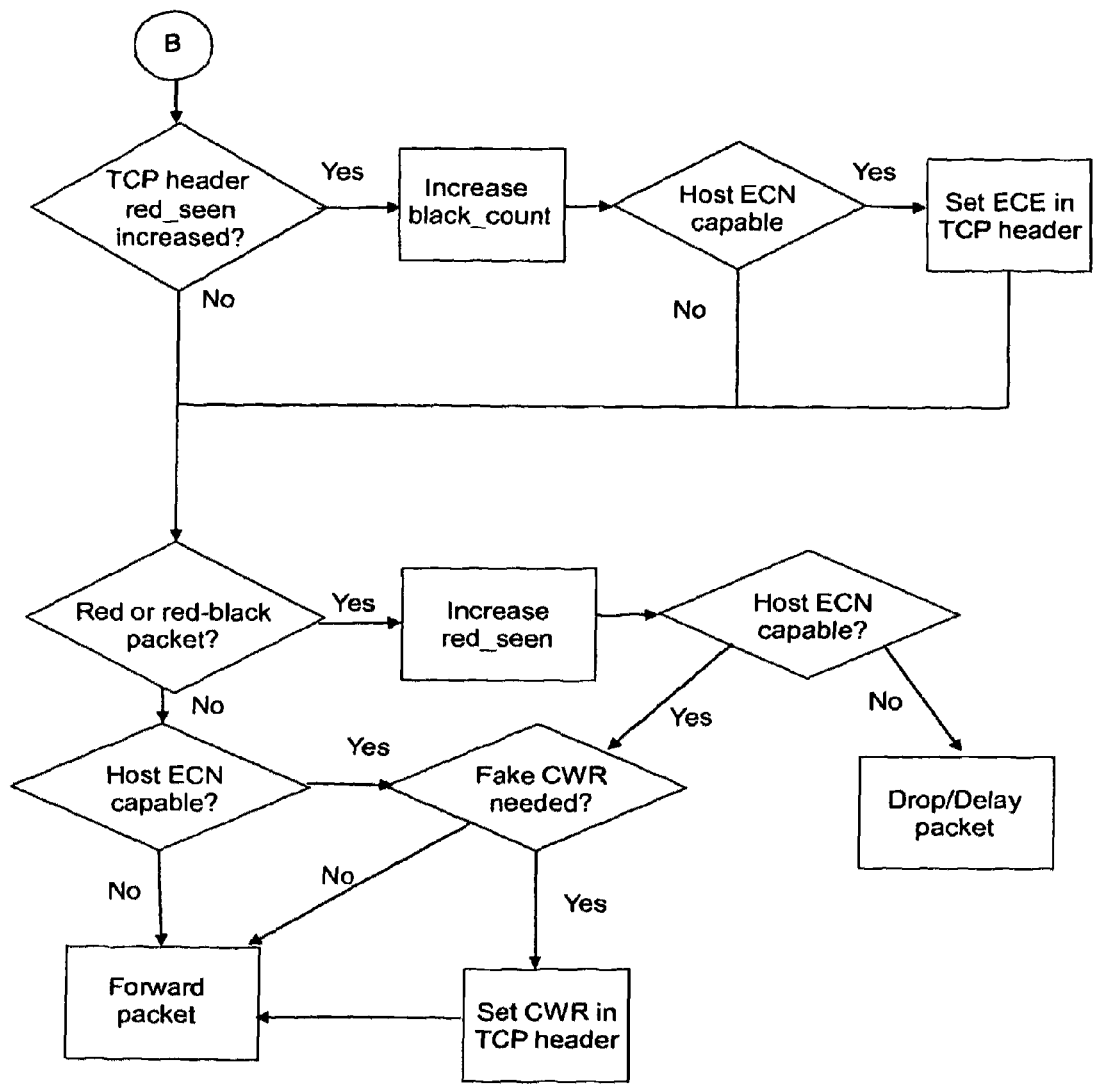
Figure 6(c) - DPI Proxy acting on Incoming packets (continued):
Handling the re-ECN Bits in the TCP Header

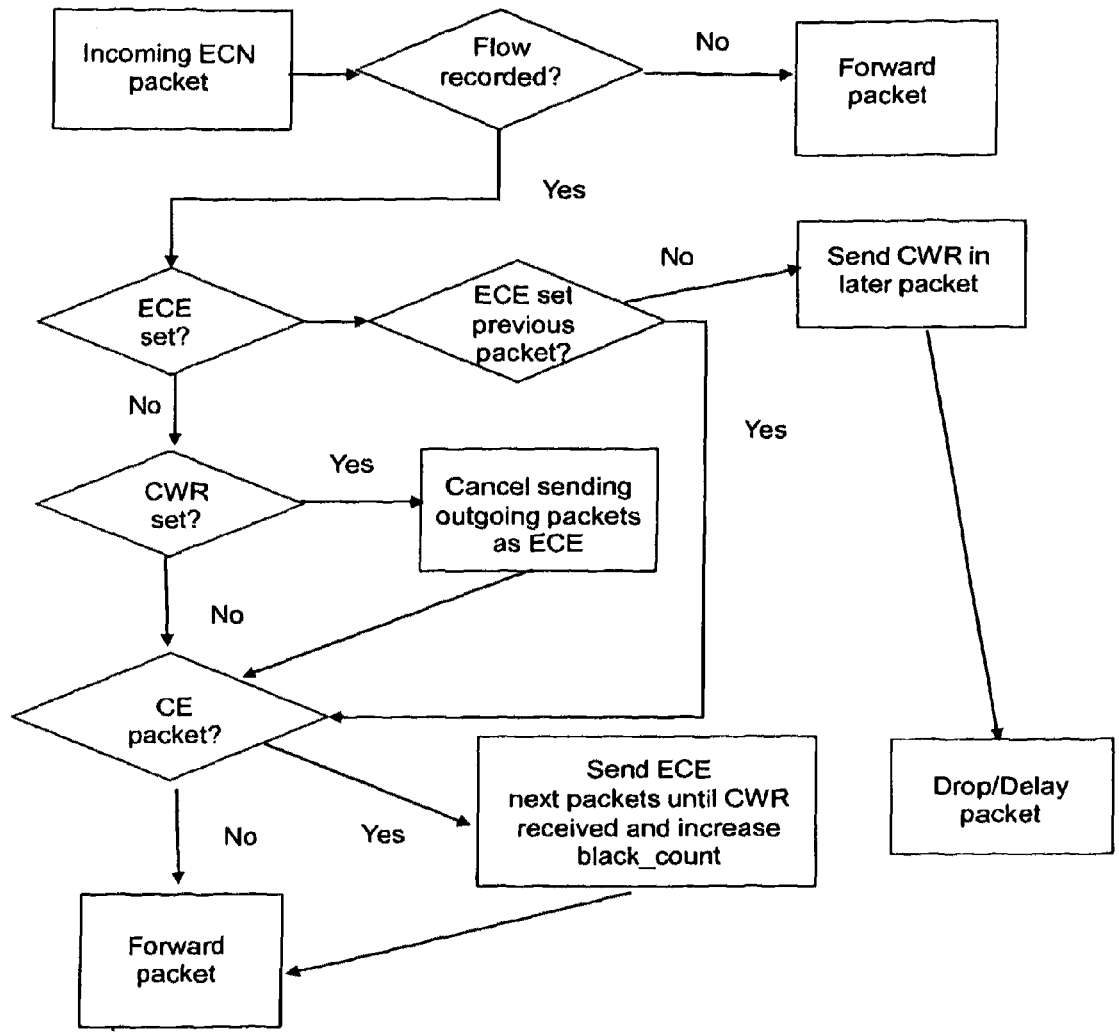
Figure 7 - Receiving packets from an ECN system at the far end

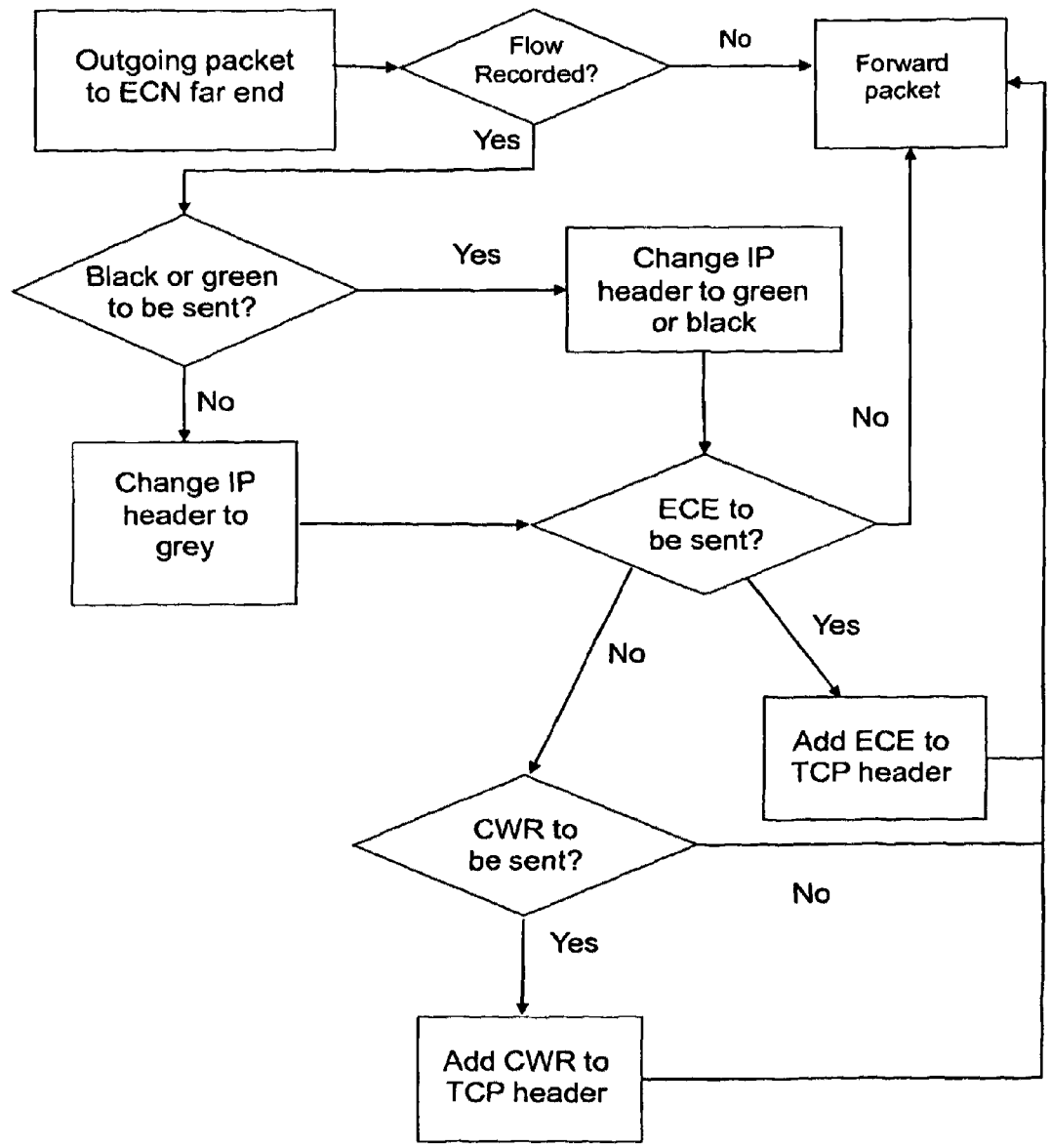
Figure 8 - Sending packets to an ECN system at the far-end

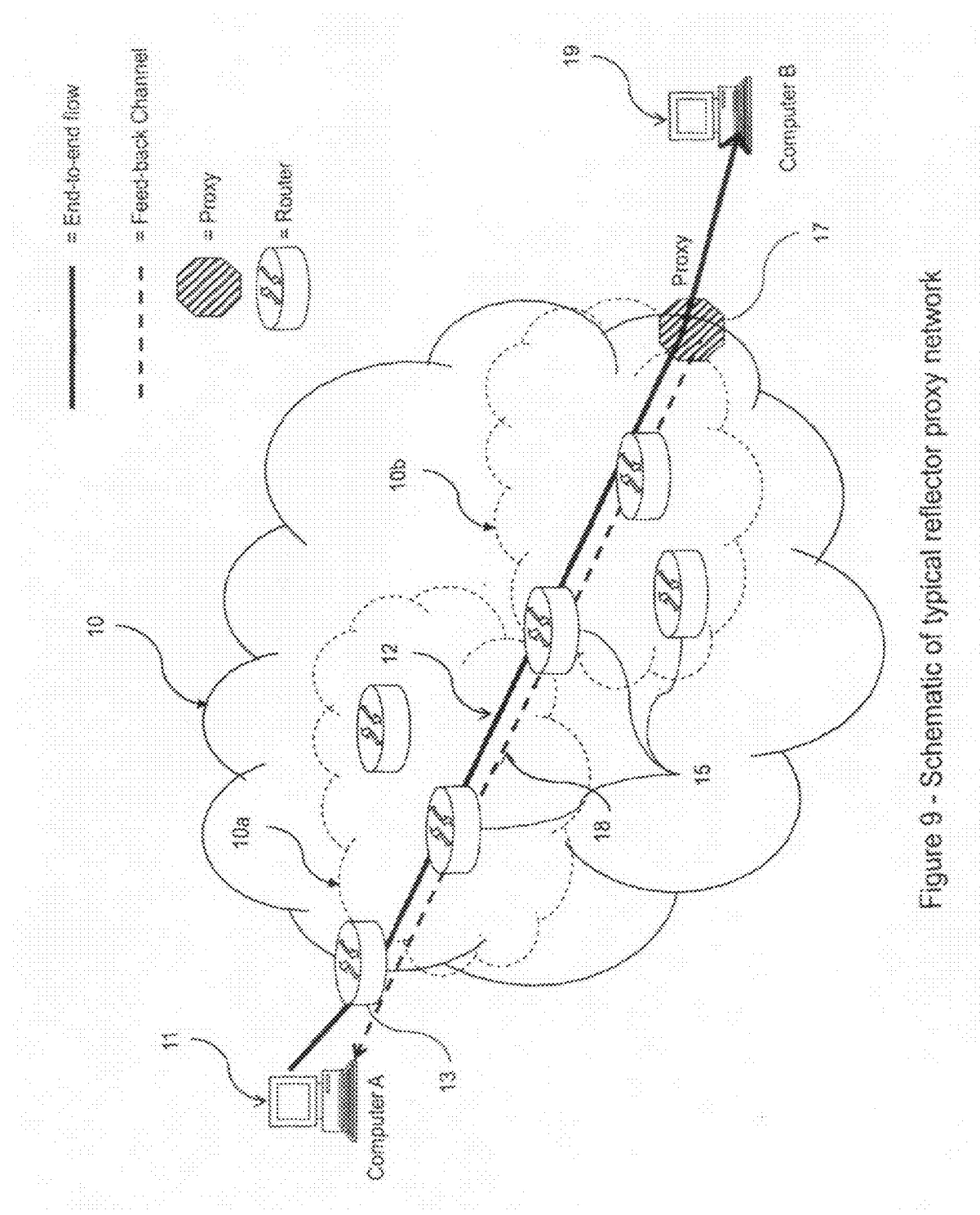
Figure 9 - Schematic of typical reflector proxy network

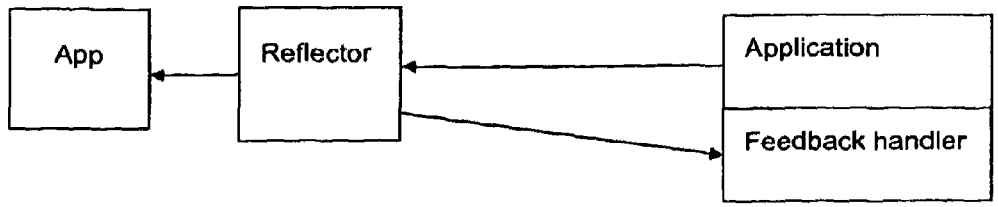
Figure 10 - Feedback from reflector to Feedback layer
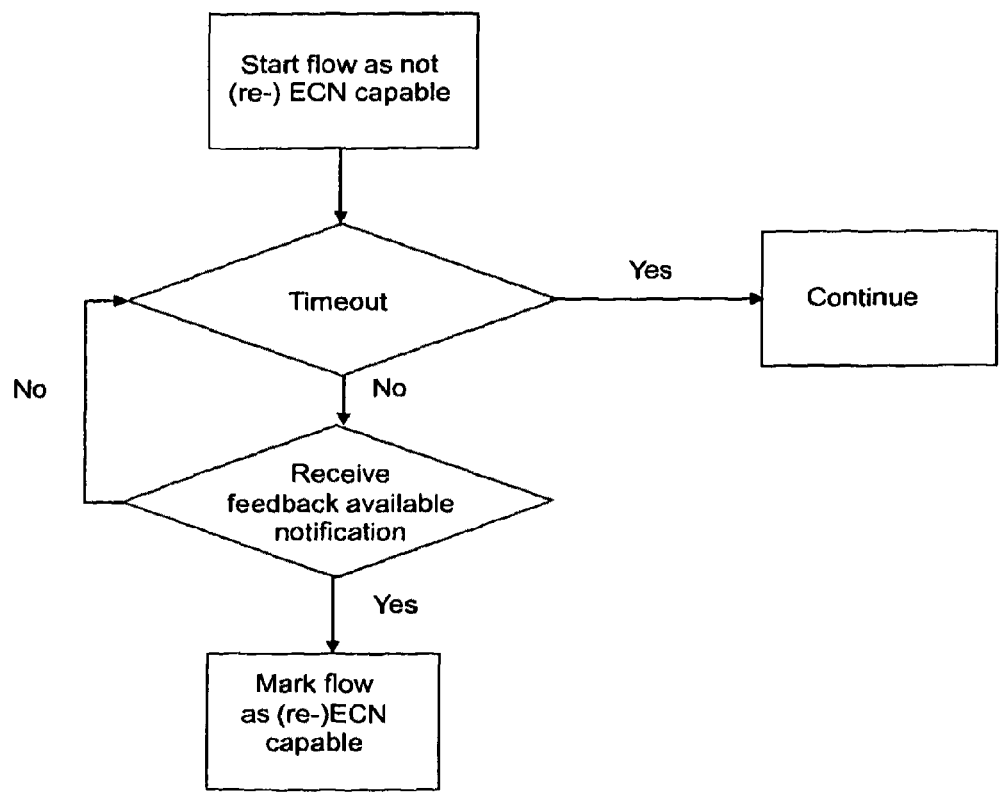
Figure 11 - Flow start on sender as NOT (re-) ECN capable

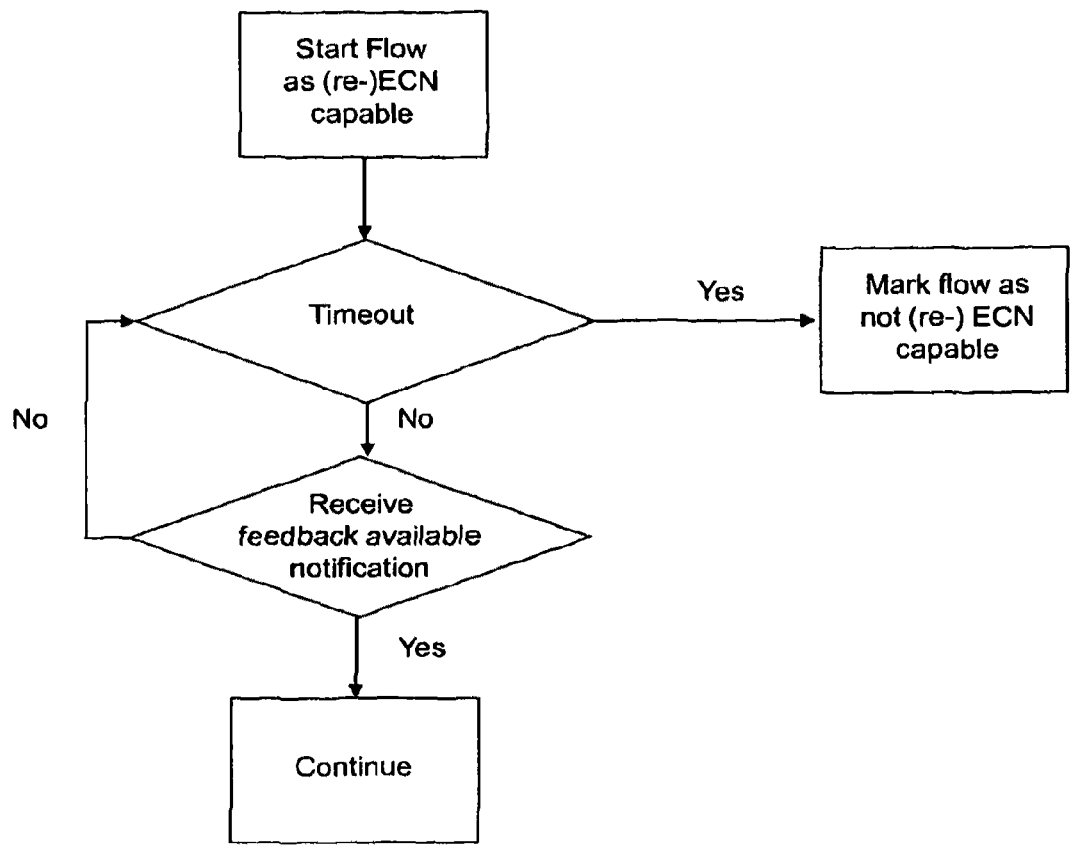
Figure 12 - Flow start on sender as (re-) ECN capable

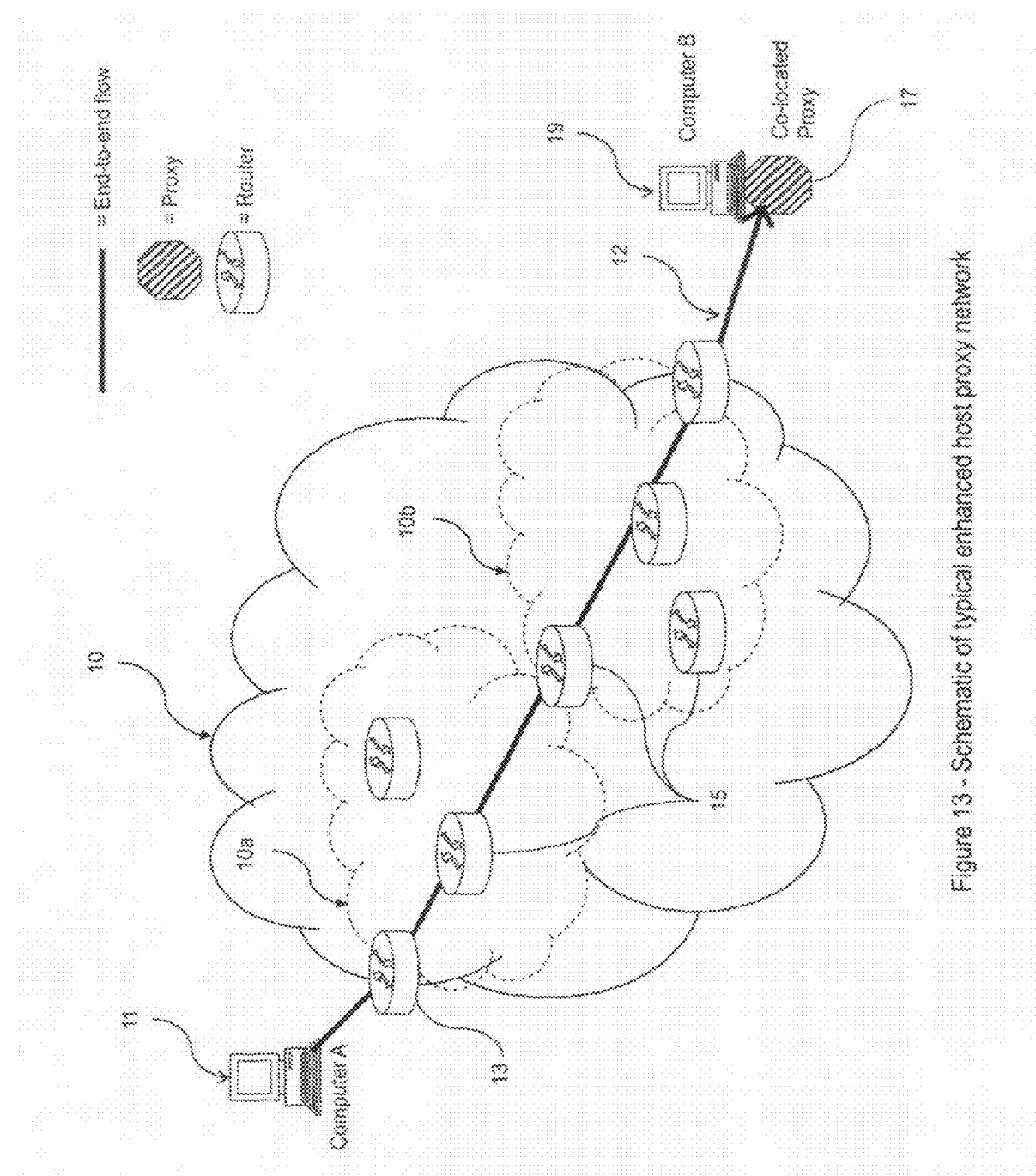
Figure 13 - Schematic of typical enhanced host proxy network

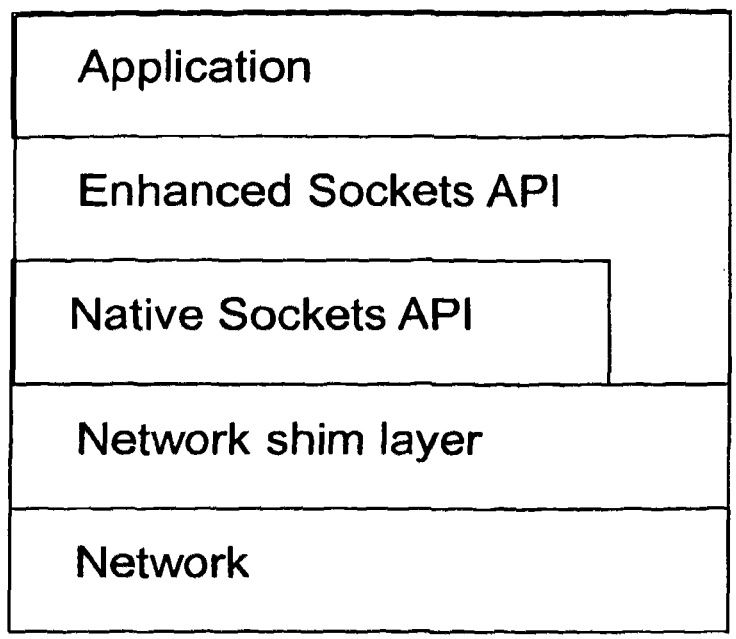
Figure 14 - Enhanced Host Networking Stack
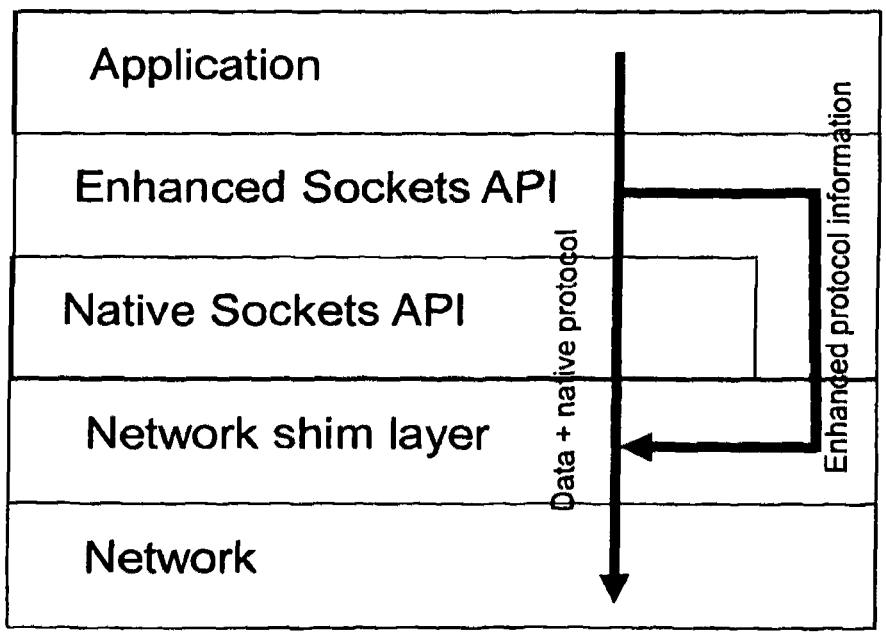
Figure 15 - Enhanced Host networking Stack – with Data Flow

PROVISION OF PATH CHARACTERIZATION INFORMATION IN NETWORKS

This application is the U.S. national phase of International Application No. PCT/GB2011/000364 filed 16 Mar. 2011 which designated the U.S. and claims priority to EP 10250693.8 filed 31 Mar. 2010, the entire contents of each of which are hereby incorporated by reference.

TECHNICAL FIELD

The present invention relates to the provision of path characterisation information in networks. More specifically, aspects of the present invention relate to methods and apparatus for providing a data sender with path characterisation information relating to a network characteristic such as congestion experienced by data units such as packets traversing a path across a data network from the data sender towards a data receiver, the data units having associated therewith, by means of one or more fields in a header or otherwise, information indicative of the network characteristic in suit.

BACKGROUND TO THE INVENTION AND PRIOR ART

Network owners and operators would like to be able to make customers accountable for any problems they cause to their network. One of the biggest problems for most networks is path congestion. When a network is congested then it is not able to provide good service to any of the customers of that network and thus its reputation may suffer. Accountability is generally done on the basis of the volume of traffic passed into the network by a given customer. The present inventors have recognised a need for a more sophisticated mechanism by which network path characteristics such as level of congestion can be collected and used for more accurate accountability purposes. These same characteristics may also be used to give advance notice of potential problems in the network and may be used to enable the network (or an entity operating the network) to react to the problems before they become too severe.

We start by presenting some basic concepts to facilitate the understanding of the mechanisms that are presented later.

Packets

Data networks usually split the data they carry into small units known as packets. The actual communication between endpoints is controlled by various communication protocols. Each communication protocol required to carry the data across the Internet adds a header that contains the required information to enable the data exchange between the end hosts (usually a source host and a destination host). In the internet, one of the most common types of packet consists of a payload that contains the data generated by an application running at the source, encapsulated by a Transmission Control Protocol (TCP) header which ensures the reliable delivery of the data, encapsulated again by an Internet Protocol (IP) header, which ensures that the data reaches the destination host for which it is aimed. The TCP header includes a unique sequence number (to allow the data to be reconstructed at the destination) and the IP header includes the IP addresses of the source and destination host.

Distributed Bandwidth Sharing and Congestion

Data traversing the Internet will follow a path between a series of routers, controlled by various routing protocols. If many paths need to use the same router in the network, this router can get congested (packets experience delays whilst using that network path). If sources persisted sending traffic through that router it may become overloaded or even fail. If sources still persist in sending traffic around this bottleneck it could force more routers to fail, and if the phenomenon keeps spreading, that can lead to a congestion collapse for the whole Internet which occurred regularly in the mid-eighties.

The solution to that problem has been to ensure that sources take responsibility for the rate at which they send over the Internet by implementing congestion control mechanisms. Sources monitor path characterisation metrics to detect when the path their data is following is getting congested, in which case they react by reducing their throughput—while they usually slowly increase it when there is no sign of the path getting congested.

The typical path characterisation metrics sources monitor are the average roundtrip time (RTT) for the data path, the variance of the roundtrip time (jitter), and the level of congestion on the path, which is the primary parameter influencing the data-rate adaptation of a source sending data over a congested path.

The congestion level can be signalled either implicitly (through congested routers dropping packet) or explicitly (through mechanisms such as explicit congestion notification—see next subsection). Currently the most common option has been implicit signalling. Historically, routers would drop packets when they got completely saturated (which happens when a traffic burst cannot be accommodated in the buffer of the router)—this policy is called Droptail. The problem with this is that it can lead to a phenomenon known as global synchronisation which reduces the overall efficiency of the network. An improvement has been proposed where routers monitor the average queue length in their buffer and when the average queue is higher than a given threshold, the router starts to drop packets with a probability which increases with the excess length of the queue over the threshold—this policy is called Random Early Detection (RED). This is discussed in more detail in the document referred to as [RED] in the list of references at the end of this section). It is widely used in today's internet because it allows sources to react more promptly to incipient congestion. Sources using TCP are able to detect losses, because a packet loss causes a gap in the sequence; whenever a source detects a loss, it halves its data-rate, which alleviates the congestion on the router at the bottleneck.

Explicit Congestion Notification

Explicit Congestion Notification (ECN) (discussed in more detail in the document referred to as [ECN]) further improves on RED by using a two-bit ECN field in the IP header to signal congestion. It runs the same algorithm as RED, but instead of dropping a packet, it sets its ECN field to the Congestion Experienced (CE) codepoint. The ECN standard requires the sender to echo any congestion mark signalled in the data; for instance, a TCP receiver sets the Echo Congestion Experienced (ECE) flag in the TCP header, which the TCP source interprets as if the packet has been dropped for the purpose of its rate control. In turn the source reduces its data-rate and sets Congestion Window Reduced (CWR) in the TCP header of the next packet.

The four values of the two-bit ECN field are:
  "Not-ECT" (i.e. "Not ECN Capable Transport"), which signifies that the packet belongs to a flow that doesn't support ECN.
  "ECT(0)" and "ECT(1)", which signify that the packet belongs to a flow that supports ECN but and that upstream routers haven't had to mark the packet.
  "CE" (i.e. "Congestion Experienced"), which signals to the receiver that a packet has experienced congestion along its path.

re-Feedback

The re-Feedback proposal [Briscoe05c] provides a mechanism whereby the congestion information that the receiver sends back to the source can be re-inserted into the forward data path, thus allowing nodes along the path to see the downstream congestion information as well as the upstream information. This allows the network provider to trace the source of any congestion and hold the appropriate customer to account for this congestion. Re-ECN is a re-feedback protocol based on ECN which makes use of an additional (i.e. third) bit in the header in order to allow for more than just the four codepoints available in ECN. We introduce the idea of packets having "colours" as a way of explaining the protocol. Packets of different "colours" are distinguishable from each other (i.e. they are assigned different re-ECN codepoints).

"Grey" packets: equivalent to ECT above—the packets are re-ECN packets.

"Red" packets: equivalent to CE above—the packets are "grey" packets that have subsequently been marked by a router as having experienced congestion.

"Black" packets: A sender sends a number of "black" packets corresponding to the number of "red" packets that have been received by the receiver. In order to do this, the receiver must tell the sender the number of "red" packets it has observed coming from the sender. This is achieved via a back-channel such as "acknowledgements" in TCP, or the RTP Control Protocol (RTCP) in RTP (Real-Time Transport Protocol), for example. This information is called the feedback. One of the principal ideas of re-feedback is that the numbers of "black" and "red" packets balance out, i.e. number of "red" packets minus number of "black" packets equals zero.

"Green" packets: When a sender starts to send packets it does not have any feedback on congestion so a number of "green" packets are sent at the start of a flow. Green packets may also be sent when an application increases its sending rate and anticipates that this will cause extra congestion.

"Red-Black" packets: These are initially "black" packets that have subsequently been marked "red" by a router. They are distinguishable from normal "red" packets (i.e. initially "grey" packets that have subsequently been marked "red").

The re-ECN protocol allows senders to be held to account for the congestion that they cause. Three mechanisms are proposed:

"Dropper" at the egress on an internetwork

"Policer" at the ingress of the internetwork

"Border Gateways" between individual networks

The dropper checks that "black" packets="red" packets for a flow ensuring that senders are sending the right number of "black" packets The policer allows a sender to send "black" packets at a particular rate. If they send above this rate, packets could be delayed or dropped. The dropper at the egress ensures that they send the right amount of "black" packets.

Border gateways allow bulk policing of traffic between independent networks.

Summary of Prior Techniques

Congestion signalling has been well documented in many forms: whether it is by using an implicit signal [RED] or an explicit binary signal [ECN].

Re-ECN has been discussed above.

The idea of using proxies within a TCP flow has been known for some time, e.g. Performance Enhancing Proxies [RFC3135]. These break a TCP flow into what is effectively two flows back to back which may be used for performance enhancement in satellite communications.

Co-pending European patent application EP 09 250 737.5 (now published as EP2230803A1) filed by the same applicant as the present application relates to techniques for the provision of path characterisation information relating to a network characteristic such as network congestion to nodes in a data network using data units being forwarded from a source to a destination. Data units each having a destination indication from a source are received at a first proxy node. A second proxy node is identified in the network, to which data units may be forwarded before being forwarded to the intended destination; and a first and at least one subsequent data unit are then forwarded from the first to the second proxy node via one or more intermediate nodes. Conditions are assigned to path characterisation metrics in respect of data units traversing a path across the network from the first to the second proxy node, the initial condition being dependent on information received by the first from the second proxy node. Such techniques effectively involve setting up two proxies then running a re-feedback protocol between them.

International patent application WO 2009/090387 relates to techniques for assigning information Indicative of a network characteristic to one of a plurality of data units traversing a path across a network, the data units having associated therewith values indicative of the network characteristic, the path having at least one portion passing through a lower-capability region and at least one portion passing through a higher-capability region, the lower-capability region being a region in which information indicative of the network characteristic may be represented by values having a first resolution, and the higher-capability region being a region in which information indicative of the network characteristic may be represented by values having a second resolution greater than the first resolution. Such techniques relate to a data unit as it passes into the higher-capability region.

[Karimi] and [Medina] describe schemes for using ECN in protocols other than TCP.

REFERENCES

[IPSec] S. Kent & K. Seo: "Security Architecture for the Internet Protocol", RFC 4301, <draft-ietf-ipsec-rfc2401bis-06.txt>, December 2005.

[Briscoe05c] B. Briscoe, A. Jacquet, C. Di Cairano-Gilfedder, A. Salvatori, A. Soppera & M. Koyabe: "Policing Congestion Response in an Internetwork using Re-feedback", Proc ACM SIGCOMM'05, Computer Communications Review 35(4), September 2005.

[ECN] K. Ramakrishnan, S. Floyd & D. Black: "The Addition of Explicit Congestion Notification (ECN) to IP", RFC 3168, <draft-ietf-tsvwg-ecn-04.txt>, September 2001.

[RED] S. Floyd & V. Jacobson: "Random Early Detection gateways for Congestion Avoidance", IEEE/ACM Transactions on Networking, Vol 1-4 (397-413), August 1993.

[Karimi] O. B. Karimi, M. Fathy & S. Yousefi: "Application level Wireless Multi-level ECN for Video and Real-time Data" Networking, International Conference on Systems and International Conference on Mobile Communications and Learning Technologies, 2006.

[Medina] O. Medina, F. Dupont & L. Toutain: "A proposal for the use of ECN bits with UDP flows", IETF Internet Draft <draft-medina-ecn-udp-00.txt>, July 2000

[PCN] P. Eardley (editor): "Pre-Congestion Notification Architecture", IETF internet draft <draft-teff-pcn-architecture-02.txt>, November 2007

[RFC3135] J. Border, M. Kojo, J. Griner, G. Montenegro & Z. Shelby: "Performance Enhancing Proxies Intended to Mitigate Link-Related Degradations", <draft-ietf-pilc-pep-07.txt>, June 2001

SUMMARY OF THE INVENTION

According to a first aspect of the present invention, there is provided a method of providing path characterisation information to a data sender relating to a network characteristic experienced by data units each traversing a path via one or more nodes across a data network from said data sender towards one of a plurality of data receivers, each of said data units having associated therewith information indicative of said network characteristic, the path being traversed by each data unit having at least a first path portion between said data sender and a proxy node along which data units may traverse having associated therewith at least a measure indicative of said network characteristic representable by any codepoint of a first set of codepoints, each of said data receivers being operable to provide data acknowledgement units in respect of data units they receive; the method comprising said proxy node performing steps of:

receiving a first data unit sent from said data sender via a first path portion, said first data unit having associated therewith a receiver indication indicative of an intended receiver for said data unit;

forwarding said first data unit along a second path portion towards said receiver;

receiving a data acknowledgement unit from said receiver in respect of said first data unit; and inspecting said data acknowledgement unit and determining therefrom whether said data acknowledgement unit has associated therewith information indicative of said network characteristic in a format indicating that said information indicative of said network characteristic is representable by any of the codepoints of the first set of codepoints;

the method further comprising said proxy node performing the following steps in respect of subsequent data units received from said data sender and having associated therewith receiver indications indicative of said receiver in the event that it is determined that said data acknowledgement unit has associated therewith information indicative of said network characteristic in a format indicating that said information indicative of said network characteristic is representable only by any codepoint of a second set of codepoints having less codepoints therein than said first set of codepoints:

storing information indicative of said network characteristic in respect of said subsequent data units;

forwarding said subsequent data units towards said receiver;

receiving subsequent data acknowledgement units from said receiver in respect of said subsequent data units;

inspecting said subsequent data acknowledgement units whereby to determine acknowledgement-based information indicative of said network characteristic; and providing for said data sender path characterisation information in respect of said subsequent data units, said path characterisation information being dependent on said stored network characteristic information and on said acknowledgement-based information.

The method may further comprise said proxy node performing the following steps in respect of subsequent data units received from said data sender and having associated therewith receiver indications indicative of said receiver in the event that it is determined that a data acknowledgement unit received from said receiver in respect of a data unit forwarded thereto by said proxy node has associated therewith information indicative of said network characteristic in a format indicating that said information indicative of said network characteristic is representable by any codepoint of a second set of codepoints having the same number of codepoints therein as said first set of codepoints:

forwarding said subsequent data units towards said receiver;

receiving subsequent data acknowledgement units from said receiver in respect of said subsequent data units;

Inspecting said subsequent data acknowledgement units whereby to determine acknowledgement-based information indicative of said network characteristic providing for said data sender path characterisation information in respect of said subsequent data units, said path characterisation information being dependent on said acknowledgement-based information.

According to preferred embodiments, the network characteristic may be a dynamic network characteristic. It may, alternatively or additionally, be an end-to-end network characteristic.

According to preferred embodiments, the network characteristic may relate to network congestion on the path being traversed by the data units in question, and may in particular relate to congestion experienced by respective data units themselves, or flows thereof.

The network characteristic may relate to other measures, such as a measure of time spent traversing the path by the data units in question.

According to preferred embodiments, the first path portion may be a portion along which data units may traverse having associated therewith, as a header according to a first protocol, for example, a measure indicative of the network characteristic represented by an n-bit value, where n is an integer greater than 1, and the second path portion may be a portion along which data units may traverse having associated therewith, as a header according to a second protocol, for example, a measure indicative of the network characteristic represented by a value having less than n bits. The first protocol may be a protocol such as "re-ECN", according to which various types of measures indicative of network characteristics such as congestion may be represented by a three-bit value (i.e. making up to eight different codepoints available).

Referring directly to the number of available codepoints rather than the number of bits, digits or other characters that may be used to represent different values or states, the first path portion may be a portion along which data units may traverse having associated therewith a measure indicative of said network characteristic represented by any one of a number "$C_H$" possible code-points, and the second path portion may be a portion along which data units may traverse having associated therewith a measure indicative of said network characteristic represented by any one of a lower number "$C_L$" possible code-points. If the first path portion is what will be termed a "re-ECN enabled", portion or passes through a "re-ECN enabled" region, this will make available any number ($C_H$) up to eight codepoints. If the second path portion is (or passes through a regions that is) not "re-ECN enabled", it may still be ECN-enabled, in which case there may be available any number ($C_L$) up to four codepoints. An even "less-enabled" region such as a "non-ECN enabled" region may provide information by the presence or absence of acknowledgements, for example, effectively allowing for measures to be represented by either of two possible code-points.

According to a second aspect, there are provided processor-implementable instructions for causing a digital processor to carry out a method according to the first aspect.

According to a third aspect, there are provided carrier means carrying processor-implementable instructions according to the second aspect.

According to a fourth aspect, there is provided an apparatus operable to perform a method according to the first aspect.

The various options and preferred embodiments referred to above in relation to the first aspect are also applicable in relation to the other aspects.

Further aspects of the present invention relate to computer programs for carrying out methods according to the first aspect, and to carrier means, most preferably tangible carrier means such as magnetic or optical disks (e.g. hard drives, CD ROMs, DVDs etc.), and to disks, solid state memory devices, and other such devices carrying such programs.

Techniques to be described allow proxies to implement feedback and re-feedback protocols where the proxies do not have to work as pairs at sender and receiver. There are different versions of these proxies with differences in how they work and where they are located.

Techniques to be described allow congestion and other metrics to be monitored over any section (or path portion) of a network without the need for protocol changes or significant equipment changes. This may make it possible to use the information for network monitoring, accountability and control purposes.

BRIEF DESCRIPTION OF THE DRAWINGS

Preferred embodiments will be described with reference to the appended drawings, in which:

FIG. 1 illustrates steps that may be performed by a proxy node on receipt of a connection request packet from a data sender;

FIG. 2 illustrates steps that may be performed by a proxy node on receipt of an acknowledgement packet from a data receiver;

FIG. 3 shows steps that may be performed by a proxy node in respect of subsequent packets;

FIG. 4 illustrates a typical single-ended "DPI proxy" network in relation to which a method according to a preferred embodiment will be explained;

FIG. 5 illustrates a "DPI Proxy" acting on outgoing packets sent from Computer A to Computer B of FIG. 4;

FIGS. 6(a), 6(b) and 6(c) illustrate a "DPI Proxy" acting on incoming packets sent from Computer B to Computer A of FIG. 4;

FIG. 7 illustrates steps that may be performed by the proxy node on receiving packets from an ECN system at the far end;

FIG. 8 illustrates steps that may be performed by the proxy node on sending packets to an ECN system at the far-end;

FIG. 9 illustrates a typical "reflector proxy" network in relation to which a method according to an alternative embodiment will be explained;

FIG. 10 shows the feedback that may be provided from the reflector proxy shown in FIG. 9 to the feedback layer;

FIG. 11 is a sender-side flow-chart for a scenario in which a sender starts sending packets as NOT (re-)ECN capable;

FIG. 12 is a sender-side flow-chart for a scenario in which a sender starts sending packets as (re-capable;

FIG. 13 illustrates a typical "Enhanced Host Proxy" network in relation to which a method according to another alternative embodiment will be explained;

FIG. 14 shows an "Enhanced Host Networking Stack"; and

FIG. 15 shows the "Enhanced Host Networking Stack" of FIG. 14, with data flow.

DESCRIPTION OF PREFERRED EMBODIMENTS OF THE INVENTION

With reference to FIGS. 1 to 3, a brief explanation will first be given of the general concept behind preferred embodiments.

In general terms, preferred embodiments relate to methods that may be performed by a proxy node located between two entities, referred to generally as a sender of data and a receiver of data, in situations where the sender and/or nodes between it and the proxy node are "more capable" in relation to the provision of path characterisation information than the receiver and/or nodes between it and the proxy node. Such path characterisation information may be information relating to a network characteristic such as path congestion.

The level of "capability" of an entity (such as the sender or receiver), or of a path between such an entity and another entity (such as the proxy node) may be determined essentially with reference to the "resolution" at which information relating to the network characteristic in suit may be carried by data units traversing the path in question. In general the resolution at which such information may be carried is determined by the number of codepoints available in the applicable header or field thereof (or other such information carrier) associated with the data unit in question. A one-bit binary field allows only two codepoints; a two-bit binary field (such as the ECN field in an IP header) makes available up to four codepoints; a three-bit binary field (such as that according to the re-ECN proposal) makes available up to eight codepoints; and so on. It will be noted that fields need not be binary—a field comprising a single decimal or hexadecimal digit makes available more codepoints than a three-bit binary field, so would be considered to be of "higher resolution", or "more capable" in relation to the carrying of information relating to a network characteristic.

An exchange of data between a sender and a receiver may be initiated with a connection request involving the sending of a packet (or other such data unit) from the sender to the receiver. On receipt of a "connection request" packet from the sender, the receiver may send an acknowledgement to the sender in the form of a "connection response" packet. Further communication may then follow this initial exchange, involving the exchange of further packets.

In addition to the functions explained above, which may be deemed to have been executed simply by virtue of the "connection request" and "connection response" packets reaching their respective intended destinations, the "connection request" and "connection response" packets, like other packets, may each provide further information such as path characterisation information. As will be explained in the following paragraphs, a proxy node performing a method according to a preferred embodiment may determine from such an initial exchange if there is a disparity between the "capability" of one or more nodes on a path between the sender and the proxy node and the "capability" of one or more nodes on a path between the proxy node and the receiver in conveying path characterisation information, and in the event that there is such a disparity, may take action in order to preserve path characterisation information that may otherwise be lost during the passage of data units across the "less capable" portion of the path.

FIG. 1 is a flow-chart showing possible steps that may be performed by a proxy node on receipt of a "connection request" packet intercepted on the path from the data sender to the data receiver. The result of the proxy node performing such steps is that a "connection request" packet indicating its capability to provide path characterisation information at a higher-resolution level (i.e. capable of carrying a measure indicative of the network characteristic representable by any codepoint of a "greater" set of codepoints) will be forwarded on towards the receiver, the resolution having been changed to this higher-resolution level if necessary.

Depending on the capability of the receiver and/or of any nodes on a portion of the path between the proxy node and the receiver, a "connection response" packet will be sent back towards the sender by way of acknowledgement, and will also be intercepted by the proxy node. FIG. 2 is a flow-chart showing the steps that may be performed by the proxy node on receipt of such an acknowledgement packet of from a data receiver. If the receiver and/or the nodes on the path between the proxy node and the receiver are also capable of conveying path characterisation information at the same higher-resolution level, the proxy node need not take any particular action in order to preserve such information—it may simply forward the packet unchanged. If, however, the proxy node establishes, by inspecting the acknowledgement packet, that the receiver and/or the nodes on the path between the proxy node and the receiver are only capable of conveying path characterisation information at a lower resolution level, the proxy node may perform additional steps in relation to subsequent packets traversing the path from the sender in question to the receiver in question in order to preserve path characterisation information that may otherwise be lost.

FIG. 3 shows the steps that may be performed by the proxy node in this instance in respect of such subsequent pickets. In particular it will be noted that rather than simply forwarding packets with any path characterisation information (in their headers or otherwise) unchanged, the proxy node stores path characterisation information obtained from packets intercepted on the way from the sender to the receiver. As will be understood from the description below of specific embodiments, this allows the proxy node to provide path characterisation information back to the sender that may depend on a combination of two factors:

(i) stored path characterisation information that has been determined (potentially at the "higher resolution") from packets that have traversed the "more capable" portion of the path from the sender to the proxy node; and (ii) any path characterisation Information that can be determined from acknowledgement packets (or other packets) that have traversed the "less capable" portion of the path from the receiver to the proxy node and which are destined to return to the sender.

Various more specific embodiments will now be described with reference to network scenarios illustrated in FIGS. 4, 9 and 13. For simplicity, these more specific embodiments will be described with reference to networks in which all of the routers on a path through the network are at least (similarly) ECN-capable (i.e. each router fully implements ECN as defined in RFC3168). It will be understood that this need not be the case in all networks to which embodiments may be applicable. In each scenario, Computer A, regarded as the sender of data (and therefore the receiver of any acknowledgements) is also at least ECN-capable, whereas the receiver of data (and therefore the sender of any acknowledgements) may be less capable.

Methods according to embodiments to be described enable the use of re-feedback to be extended to protocols other than TCP in relation to scenarios in which a node (such as a computer receiving data) does not implement re-feedback. Various embodiments will be described, which fall broadly into the following categories:

Deep Packet Inspection (DPI) proxy versions
Reflector versions
Enhanced host networking versions Preferred embodiments according to each of these variants may allow an ECN or non-ECN host to talk to a host that is using re-ECN.

Deep Packet Inspection (DPI) Proxy

An embodiment falling under the "DPI proxy" category will now be described with reference to FIG. 4, which represents a typical single-ended proxy network.

FIG. 4 illustrates a data communication path 12 enabling end-to-end flow of data between two computers or other such user terminals, which will be referred to as a "Computer A" 11 and a "Computer B" 19. These are connected across network 10 with several intermediate routers 15. To simplify the description, the following explanation relates to a situation where Computer A is simply acting as a sender of data while Computer B is simply acting as a receiver of data. It will be understood that both computers may in fact be performing sending and receiving functions.

Computer A is connected to the network 10 through a network attachment node 13. Computer B is connected to the network via a node 17 which acts not only as an attachment node but also as a "proxy", as will be explained below.

It should be noted that there may be a plurality of interconnected networks 10a, 10b, etc. (shown using dashed lines) between Computer A and Computer B, possibly of different types or operated by different network providers or other entities, rather than a single, homogenous, uniformly-controlled network, but for the purposes of this description, it will generally be treated as being a single network 10.

The DPI proxy works by inspecting packets down to the transport layer. The proxies can act either for a host initiating a connection or for a host responding to a connection request. In both methods of operation the host could be either (vanilla) ECN-enabled or not ECN-enabled.

The DPI proxy has two roles:

Role 1: As a transmitter of "faked" re-ECN packets (that it has received from the host)

Role 2: As a receiver of re-ECN packets from the network that it then forwards as standard ECN or non-ECN packets.

Its operation is indicated in the flow diagrams shown in FIGS. 5 to 8. The explanation below relates to an embodiment where a proxy is communicating with a re-ECN host at the far end of the path through the network, but it will be noted that alternative embodiments exist wherein the proxy and the re-ECN host are co-located, or are at least located at the same end.

State is held for flows of interest to the proxy:

(i) A "red_seen" field for the number of "red" packets seen on incoming data.

(ii) The amount of "black" and (initially) "green" marks to be set.

(iii) When a CWR must be forwarded to the host (this must be forwarded to the host on the next incoming packet from the far host after the near host has sent a packet with ECE set).

FIG. 5 shows the proxy acting on outgoing packets (this is "Role 1" referred to above).

Outgoing TCP SYN (i.e. "synchronisation") packets are intercepted and the following steps are taken:

The packets are marked to be re-ECN (i.e. their TCP headers are set to include an indication to the eventual receiver that the flow is capable of transmitting re-ECN information so that if the receiver is also capable of receiving re-ECN information then subsequent packets in the flow will include a re-ECN field in their IP headers);

An entry is created for the new flow in the proxy's database;

If the original SYN packet showed that the host was ECN-enabled, this fact is recorded for the flow;

The packet is forward transmitted.

Outgoing TCP SYN-ACK (i.e. "synchronize-acknowledge") packets are modified to be re-ECN if there is an entry in the database for the flow. If the host has responded to the incoming re-ECN SYN packet with an ECN SYN-ACK packet, the fact that it is ECN-capable is added to the database.

FIGS. 6(a), 6(b) and 6(c) show the proxy acting on incoming packets (this is "Role 2" above).

Incoming TCP SYN packets that are marked as re-ECN capable are intercepted and recorded as being re-ECN capable in the database. When the outgoing corresponding SYN-ACK packet is detected this is changed to being re-ECN.

Incoming SYN-ACK packets not marked as re-ECN or ECN are removed from the database.

The following figures represent receiving and sending packets to a host at the far end that has requested ECN. This has to be supported because if our proxy sends a re-ECN SYN and gets back an ECN SYN-ACK the host at the far end will have assumed it is talking to an ECN host.

FIG. 7 shows the steps that may be performed by the proxy node on receiving packets from an ECN system at the far end. Every time a packet is received at the proxy from a host that is ECN capable, the proxy stores information so that the proxy can make the correct responses to the ECN protocol that the ECN host is expecting. The packets from an ECN host may carry two types of information:

(i) Information about congestion that has been observed on the path from the host. This is signalled as CE ("Congestion Experienced"); and (ii) Information about congestion that the host has observed on packets it has received. This is signalled as ECE ("Echo Congestion Experienced") or CWR ("Congestion Window Reduced").

For CE marked packets the proxy performs two actions:
(i) It sends all outgoing packets marked ECE until it receives a packet marked CWR;
(ii) It records the fact that congestion has been experienced so that it can mark packets from the proxy to the host with the colour "black". Note that this may provide the same path congestion information that re-ECN generally provides along the path, but will generally be ignored by the end-host, which understands ECN but not re-ECN.

For ECE, the proxy delays or drops the packet in order that the receiving host can tell that there was congestion on the path. It also sends a CWR flag in a later outgoing packet. If a CWR flag is received then the proxy can stop sending outgoing packets marked ECE.

FIG. 8 shows the steps that may be performed by the proxy node on sending packets to an ECN system at the far-end. For outgoing packets, the proxy sets packet headers appropriately to match those expected by an ECN host. In addition it can mark packets with colours ("black", "green" and "grey"). Note this may provide the same path congestion information that re-ECN generally provides along the path, but will generally be ignored by the end-host which only understands ECN.

As well as setting a colour to the IP header, ECE or CWR may be set. When to set these may be determined based on what has been seen and stored in previous incoming packets.

Reflector

An embodiment falling under the "Reflector" category will now be described with reference to FIG. 9, which represents a typical reflector proxy network.

FIG. 9 is similar to FIG. 4, so corresponding reference numerals have been used where appropriate. It also illustrates a data communication path 12 between two computers or other such user terminals, referred to again as "Computer A" 11 and "Computer B" 19, but it will be noted that as well as the data communication path 12, there is a feedback channel 18 enabling the provision of feedback data in the opposite direction, from the proxy 17 back to Computer A.

Where a proxy is not involved in the set up of a flow it can still play a part in providing feedback to a sender thus allowing that sender to react to feedback and inject re-feedback into the flow.

A proxy may not be able to see beyond the IP header (IP Sec) or there may not be a specific feedback mechanism for a protocol. If the sender is capable of sending re-ECN packets, then an intermediate node can detect this and offer to give feedback to the sender.

The sender must provide an interface for the reflector to feedback to. This could be a well-known port number, for example.

On the receiver a reflector is introduced at a point between the last queue that packets can be congestion marked and the receiving host application. The reflector detects an ECN or re-ECN capable flow and opens up a connection to the sender's feedback port.

The reflector can be located in any of the following locations, for example:

In the network (downstream of the last congestible queue)
In the home hub
As a daemon in the host Its role is to detect ECN and re-ECN capable flows, open a connection to a well-known port and send feedback packets to the sender. There is no restriction on the data being sent back as there is in TCP acknowledgements so an accurate count of the total congestion experienced can be sent back to the sender.

The reflector detects a flow either by observing a SYN packet (TCP) or a flow start packet (UDP). In a refinement, marking SYN packets with a flow start at the IP layer obviates the need to inspect packets deeper than the IP layer.

One issue for UDP flows is whether to mark the flow as re-ECN capable before or after feedback is received.

1) Assume not but start with flow start packet. Packet detected by reflector. Reflector opens connection to a well-known port on the sender. Sender starts to send packets as re-ECN capable. The sender side flow chart is shown in FIG. 10.

2) Assume it is. Start with flow start packet. Sender starts a timer. If timeout reached without feedback connection being opened, sender transmits remainder of packets as not being re-ECN capable. The sender-side flow chart is shown in FIG. 11.

3) Mark all packets as tentative re-ECN—this would involve using the codepoint in the IP header identified in re-ECN as "currently unused".

A sender receiving a connect request on its feedback port can accept or reject the request depending on whether it has also received confirmation that the host is capable of handling ECN or re-ECN.

Once a connection has been established, the reflector simply sends a count of the number of ECN or re-ECN marks detected.

A sender-side flow chart corresponding to FIG. 11, but where the sender transmits the remainder of packets as being re-ECN capable, is shown as FIG. 12.

Enhanced Host Networking

An embodiment falling under the "Enhanced host networking" category will now be described with reference to FIG. 13, which represents a typical enhanced host proxy network.

FIG. 13 is again similar to FIG. 4, so again, corresponding reference numerals have been used where appropriate. It also illustrates a data communication path 12 between two computers or other such user terminals, referred to again as "Computer A" 11 and "Computer B" 19, but it will be noted that the proxy 17 is co-located with Computer B.

This can be thought of as "sandwiching" the network layer of a host not natively capable of handling (re-) ECN. The enhanced host networking works with the application to respond to congestion. The enhanced host networking can also be thought of as a shim layer between the network and the network stack and an enhanced socket application program interface (API) that sits between the application and the native socket API of the host system. The shim layer communicates with the enhanced socket API in order to pass information concerning the packets as they appear on the wire that is not available from the native socket API.

This idea could be extended to any protocol not natively supported by the host. The shim layer can read packets exactly as they are on the wire and pass this information onto an application that is aware of that protocol using the enhanced sockets API. In the other direction the application make enhanced socket calls that the enhanced socket API splits into calls on the native sockets API and calls to the shim layer to add data not handled by the native socket API.

In an alternative embodiment there is no enhanced socket API and applications communicate separately with the shim layer.

We will now return to a description of re-ECN to explain how incoming packets are intercepted and any (re-) ECN markings recorded. SYN and SYN-ACK packets are handled in the same way as the proxy, i.e. the shim layer looks for incoming SYN packets which are re-ECN record the fact and mark the outgoing SYN-ACK as re-ECN. Outgoing SYN packets are likewise changed to be re-ECN and the shim layer looks out for the corresponding SYN-ACK to test whether the flow will be re-ECN, ECN or neither.

Once a flow is established incoming packets are checked by the shim layer to detect congestion ("red" or "red-black" packets) on the incoming packets or feedback ("red_seen") from the far-end concerning congestion experienced by the host's own packets. Detected "red" or "red-black" packets are recorded by the shim layer and will in turn be fed back to the far-end host as the ACK (i.e. "acknowledge") for the next packet(s) to be sent out. This information is not passed on to the enhanced sockets API.

The ACK packets detected by the shim layer will reveal the amount of congestion experienced by this hosts own packets and must be fed back into the network as "black" packets. The shim layer is responsible for injecting the same amount of re-feedback as feedback has been received ("red"="black"). In addition the feedback must be made available to the application via the enhanced sockets API so that the application can respond to the congestion. The enhanced socket API communicates with the shim layer to find the congestion level given by the feedback received and returns this as an additional parameter on a new read function.

FIG. 14 shows an enhanced networking stack. The network shim layer modifies outgoing packets so that protocols supported by the host operating system can be translated into protocols not supported by the host operating system. In the reverse direction it modifies incoming packets from protocols not supported by the host operating system to protocols that are supported by the host operating system. This modification could be changing fields in the headers, e.g. adding in support for re-ECN, or it could be a complete change in the protocol headers. Where protocol support is offered in this way, it is also possible for additional information to be passed by the application or for the application to receive additional information from the protocol.

FIG. 15 shows the outgoing data from the host to the network. The application uses the enhanced networking API to send the application data along with some other data to be used within the protocol, e.g. in re-ECN this could be an indication to send the data marked with green packets when the application needs to burst at a higher data rate and that higher data rate might potentially cause increased congestion in the network. The host operating system will not understand this extra field, so the enhanced networking API passes only the application data to the sockets API. The Indication to mark the packets green is passed from the enhanced networking API to the network shim layer. The network shim layer then marks the outgoing packets as green before they are transmitted across the network. For incoming packets the application might be capable of understanding congestion marks and so the network shim layer records these and passes this information to the enhanced networking API which returns them to the application along with the data.

The invention claimed is:

1. A method of providing path characterisation information to a data sender relating to a network characteristic experienced by data units each traversing a path via one or more nodes across a data network from said data sender towards one of a plurality of data receivers, each of said data units having associated therewith information indicative of said network characteristic, the path being traversed by each data unit having at least a first path portion between said data sender and a proxy node along which data units may traverse having associated therewith at least a measure indicative of said network characteristic representable by any codepoint of a first set of codepoints, each of said data receivers being operable to provide data acknowledgement units in respect of data units they receive; the method comprising said proxy node performing steps of:

receiving a first data unit sent from said data sender via a first path portion, said first data unit having associated therewith a receiver indication indicative of an intended receiver for said data unit;

forwarding said first data unit along a second path portion towards said receiver;

receiving a data acknowledgement unit from said receiver in respect of said first data unit; and inspecting said data acknowledgement unit and determining therefrom whether said data acknowledgement unit has associated therewith information indicative of said network characteristic in a format indicating that said information indicative of said network characteristic is representable by any of the codepoints of the first set of codepoints;

the method further comprising said proxy node performing the following steps in respect of subsequent data units received from said data sender and having associated therewith receiver indications indicative of said receiver in the event that it is determined that said data acknowledgement unit has associated therewith information indicative of said network characteristic in a format indicating that said information indicative of said network characteristic is representable only by any codepoint of a second set of codepoints having less codepoints therein than said first set of codepoints:
- storing information indicative of said network characteristic in respect of said subsequent data units;
- forwarding said subsequent data units towards said receiver;
- receiving subsequent data acknowledgement units from said receiver in respect of said subsequent data units;
- inspecting said subsequent data acknowledgement units whereby to determine acknowledgement-based information indicative of said network characteristic; and
- providing for said data sender path characterisation information in respect of said subsequent data units, said path characterisation information being dependent on said stored network characteristic information and on said acknowledgement-based information.

2. A method according to claim 1, the method further comprising said proxy node performing the following steps in respect of subsequent data units received from said data sender and having associated therewith receiver indications indicative of said receiver in the event that it is determined that a data acknowledgement unit received from said receiver in respect of a data unit forwarded thereto by said proxy node has associated therewith information indicative of said network characteristic in a format indicating that said information indicative of said network characteristic is representable by any codepoint of a second set of codepoints having the same number of codepoints therein as said first set of codepoints:
- forwarding said subsequent data units towards said receiver;
- receiving subsequent data acknowledgement units from said receiver in respect of said subsequent data units;
- inspecting said subsequent data acknowledgement units whereby to determine acknowledgement-based information indicative of said network characteristic
- providing for said data sender path characterisation information in respect of said subsequent data units, said path characterisation information being dependent on said acknowledgement-based information.

3. A method according to claim 1, wherein said network characteristic is a dynamic network characteristic.

4. A method according to claim 1 wherein said network characteristic is an end-to-end network characteristic.

5. A method according to claim 1 wherein said network characteristic relates to network congestion on said path.

6. A method according to claim 5 wherein said network characteristic is congestion experienced by a data unit.

7. A method according to claim 1 wherein said network characteristic relates to a measure of time spent traversing said path by a data unit.

8. A method according to claim 1 wherein the first path portion is a portion along which data units may traverse having associated therewith a measure indicative of said network characteristic represented by an n-bit value, where n is an integer greater than 1, and wherein the second path portion is a portion along which data units may traverse having associated therewith a measure indicative of said network characteristic represented by a value having less than n bits.

9. A method according to claim 8 where n is 3.

10. A method according to claim 1 wherein first path portion is a portion along which data units may traverse having associated therewith a measure indicative of said network characteristic represented by any one of $C_H$ possible code-points, and wherein second path portion is a portion along which data units may traverse having associated therewith a measure indicative of said network characteristic represented by any one of $C_L$ possible code-points, where $C_H$ is an integer larger than $C_L$.

11. A method according to claim 10 where $C_L$ is such that $1 \leq C_L \leq 4$, and wherein $C_H$ is such that $5 \leq C_H \leq 8$.

12. A non-transitory storage medium storing processor implementable instructions for causing a digital processor to carry out a method according to claim 1.

13. An apparatus operable to perform a method according to claim 1.

* * * * *